T. G. Otterson,
Fruit Jar Cover,
N° 51,613. Patented Dec. 19, 1865.
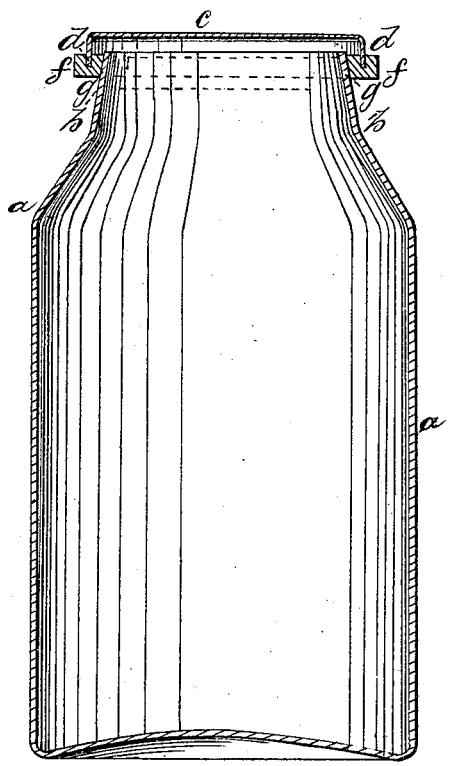
Witnesses.
Inventor.

UNITED STATES PATENT OFFICE.

T. G. OTTERSON, OF PORT ELIZABETH, NEW JERSEY.

IMPROVEMENT IN COVERS FOR FRUIT-JARS.

Specification forming part of Letters Patent No. 51,613, dated December 19, 1865.

*To all whom it may concern:*

Be it known that I, T. G. OTTERSON, of Port Elizabeth, in the county of Cumberland and State of New Jersey, have invented a new and useful Improvement in Fruit-Jar Covers; and I do hereby declare that the following is a full, clear, and exact description thereof, which will enable others skilled in the art to make and use the same, reference being had to the accompanying drawing, forming part of this specification.

This invention consists in using, in connection with a fruit-jar, bottle, can, or other similar article having its neck of a plain conical shape, a cover made of metal, glass, or other suitable material, with and extending entirely around its edge, both on its outside and inside, a molded india-rubber or other elastic ring, in contact with the jar, the principal object of which is to enable an air-tight joint to be formed by the cover with the jar when the cover is applied thereto, while at the same time the cover can be easily and readily detached therefrom if desired to use any of the material contained in it.

In accompanying plate the figure represents a central vertical section of a glass fruit-jar with a cover applied to it according to my improvement.

*a a* in the drawing represent a jar made of glass or any other suitable material, and of any desired size and shape, but with a conical-shaped neck, *b*, over which is placed a cover, *c*, slightly beveled upon its inner side, having upon its lower edge, *d*, and extending entirely around it, both upon its inside and outside, a molded india-rubber or other elastic ring, *f*, which is formed of or molded in one piece, the inner side coming in contact with the conical neck of the jar.

The cover *c* can be made of sheet metal, glass, or any other suitable material, and by having its edge covered with the elastic molded ring, as described, when the cover is applied to a jar the contents of which are heated the cover is necessarily tightly and closely held upon the jar by the pressure of the atmosphere in consequence of the vacuum formed within the jar as the material therein becomes cooled, the peculiar form of the neck, as is obvious, thus securing a perfectly air-tight joint.

Among the many advantages of my improvement in fruit-jars and covers may be here mentioned, as the most important, that by forming the elastic ring upon the outside as well as the inside of the cover-edge it is prevented from becoming so wedged in and between the cover and jar that the cover can be easily detached therefrom when desired; that the pressure of the atmosphere serves to tightly hold the cover upon the jar; that no grooves, shoulders, or projections are necessary upon either the jar or cover, they being both plain, and that by turning down any portion of the elastic ring upon the outside of the cover that on the inside can be pulled out, so that in case the cover or the jar is in any way corroded, which would serve to prevent the cover from being readily removed if the ring was only upon its inside, no hindrance shall thus result to its removal, which, as is well known, is quite a desideratum in fruit-jars, cans, bottles, &c.

I claim as new and desire to secure by Letters Patent—

In combination with a fruit-jar, can, bottle, or other similar article having a conical-shaped neck, a cover with a molded india-rubber or other elastic ring, formed of one piece and extending around both the outside and inside of its edge, substantially as herein described, and for the purposes specified.

THOMAS G. OTTERSON.

Witnesses:
 WILLIAM M. MITCHELL,
 GEORGE WEISER.